Figure 1:
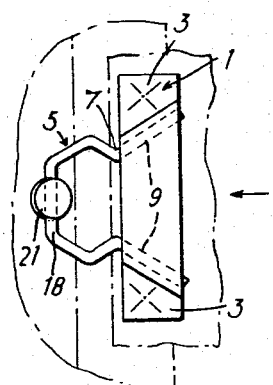

Oct. 18, 1966 W. A. ANCLIFF 3,279,018
FASTENER
Filed June 2, 1964 2 Sheets-Sheet 1

Inventor
WALTER A. ANCLIFF
By John F. Faulkner
John J. Roethel
Attorneys

Oct. 18, 1966  W. A. ANCLIFF  3,279,018
FASTENER
Filed June 2, 1964  2 Sheets-Sheet 2
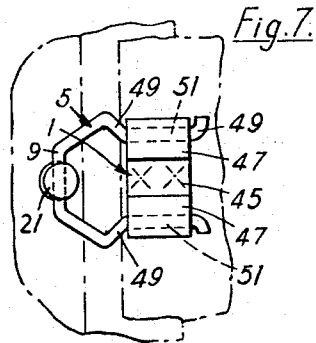
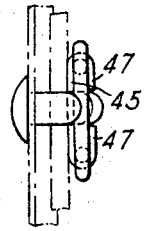
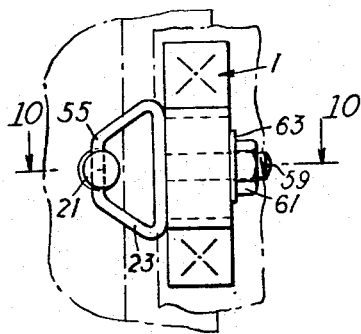
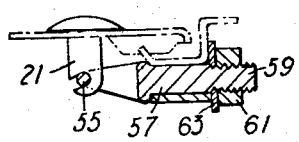
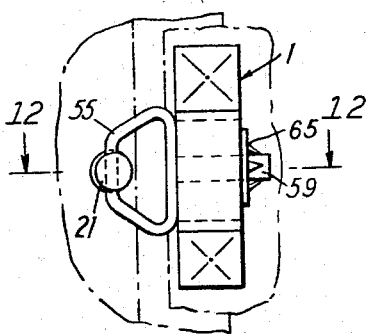
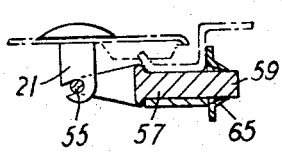
Inventor
WALTER A. ANCLIFF
By John R. Faulkner
John J. Roethel
Attorneys

United States Patent Office 3,279,018
Patented Oct. 18, 1966

3,279,018
FASTENER
Walter A. Ancliff, Upminster, England, assignor to Ford Motor Company, Dearborn, Mich., a corporation of Delaware
Filed June 2, 1964, Ser. No. 371,908
2 Claims. (Cl. 24—221)

This invention relates to quick-operating fasteners for releasably securing removable members to support members.

More particularly, the present invention embodies an improvement in a type of quick-operating fastener known as a "quarter-turn" fastener. A fastener of this type is fully described in U.S. Patent 1,955,740, issued to W. Dzus on April 24, 1934. Basically, it comprises a stud with a spiral cam engageable with a spring wire member. When the stud is turned a quarter-turn, the spiral cam engages the wire member with a spring compression action causing the stud to be seated in a locked position. The stud is rotatably seated in one member and the spring wire member, which has hitherto consisted of a length of spring wire, is usually riveted to the outer member at its two ends. These fasteners have hitherto been used almost exclusively to hold two metal surfaces in firm and flush contact. In order to obtain this firm contact between the two surfaces, the length of spring wire has been slightly bent when engaged by the fastener, the resiliency of the wire pulling the fastener, and hence the member to which it is attached, toward the member to which the wire is attached.

The wire at the point engaged by the stud wire cam must be movable through a certain minimum distance from the plane of the rivets in order to allow for manufacturing tolerances in the actual riveting operation and in the dimension of the stud; this distance, however, must not be such as to bend the wire excessively. In order to prevent excessive bending of the wire, it has been necessary to make the wire an appreciable length.

Two factors have contributed to the relatively small use of this type of quarter-turn fasteners in motor vehicles: the first is that the distance between the riveted ends of the wire (in other words, the length of the wire) results in the fastener components occupying more space than is often desirable; and, the second is the requirement that the wire should be sufficiently resilient to hold the two members in close contact to effect a seal. This latter requirement has prevented the wire from being riveted to the body of a motor vehicle before it passes through a paint drying oven, since the heat of the paint drying operation would result in deterioration of the spring.

The present invention is based largely on the realization that the resiliency of the wire is not necessary when a resilient seal is interposed between the members to be secured to each other, since metal-to-metal contact between the members is no longer necessary or possible. Ordinarily, since under such circumstances the wire does not have to bend when engaged by the stud with a spiral cam, its length may be very much reduced.

The reduced length of the wire permits the utilization of improved means for mounting the wire on the support member.

According to the present invention, the bracket holding the wire element to one of the body members is constructed and arranged to prevent movement of the wire element parallel to or transversely of the axis of the rotatable stud with the spiral cam when engaged by the latter. The wire element is removable, at will, from the bracket in a direction transverse to the axis of the rotatable stud with the spiral cam for disassembly purposes when disengaged from the stud.

The wire element embodying the present invention occupies much less space than the riveted wire previously known; and, when the fastener is used in a motor vehicle, the wire element and its mounting bracket may be fitted to the body before the body is passed through the drying oven, or the bracket may be fitted to the body before it passes through the oven and the wire element may then be fitted afterwards.

Figure 2:
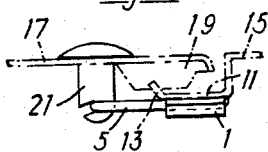
Figure 3:
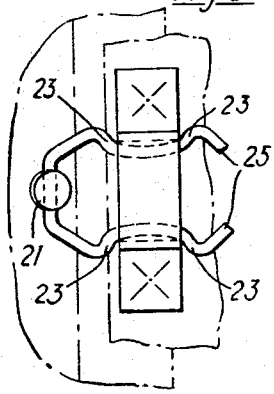
Figure 4:
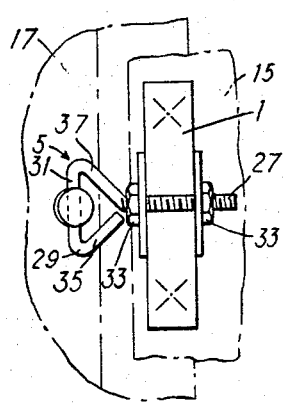
Figure 5:
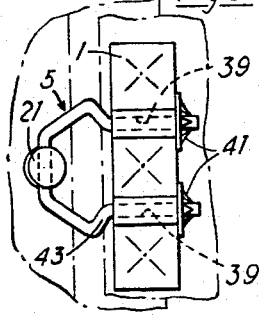
Figure 6:
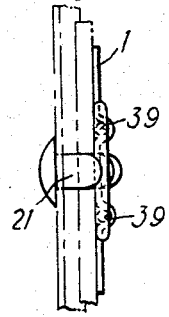

The invention is hereinafter particularly described with reference to the accompanying drawings in which:

FIG. 1 is a bottom plan view of one embodiment of the present invention;
FIG. 2 is a side elevation of FIG. 1;
FIG. 3 is a plan view of a further embodiment;
FIG. 4 is a plan view of yet another embodiment;
FIG. 5 is a plan view of yet another embodiment;
FIG. 6 is an end view of the embodiment shown in FIG. 5;
FIG. 7 is a plan view of another embodiment;
FIG. 8 is an end view of the embodiment shown in FIG. 7;
FIG. 9 is a plan view of another embodiment;
FIG. 10 is a section on the line 10—10 of FIG. 9;
FIG. 11 is a plan of yet another embodiment; and
FIG. 12 is a section on the line 12—12 of FIG. 11.

The embodiment of the invention shown in FIG. 1, comprises a channel-shaped bracket 1 having out-turned feet 3 which, in use, are welded to one of two relatively movable members. The channel is tapered—that is, its right end (as viewed in FIG. 1) is wider than its left end. The channel receives the U-shaped element 5 which has a shoulder 7 and a straight portion 9 on each leg thereof. The element 5 is made of wire with the parts thereof lying in substantially planar relationship to each other and is inserted into the channel by sliding it from the right in the direction of the arrow. The legs 9 of the U-shaped element, as the shoulders 7 engage the edges of the channel, are forced inwardly. As the shoulders 7 clear the narrow end of the channel, the legs 9 spring outwardly so that the shoulders 7 engage the end of the bracket to prevent movement of the element either inwardly or outwardly in its own plane to the left or the right as viewed in the drawing. The base of the channel prevents movement of the element in a direction perpendicular to the plane which contains its legs.

The wire element, as shown, is fitted to the base 11 of a channel-shaped edge 13 of a support member 15. Another member 17, which may be a body panel or the like, which is movable relatively to the member 15, has a seal 19 and a rotatable stud with the spiral cam 21. To secure the members 17 and 15 together, the rotatable stud with the spiral cam is used in a normal manner with the exception that the straight portion 18 of the U-shaped element 5 is not, during turning of the stud, bent to the same extent as the spring element used with a conventional spiral cam quarter-turn fastener. Instead, the compression of the seal 19 permits angular movement of the plane of the member 15 relatively to the plane of the member 17, and this movement enables the straight portion 18 of the element 5 to pass over the cam surface in the stud. This seats the stud in locked position.

The wire element shown in FIG. 3 is more or less the same as the wire element shown in FIGS. 1 and 2, except that the element is provided with a pair of shoulders 23 in each of its leg portions. The channel in the bracket is of uniform width, and the element 5 is adapted to be inserted into the bracket from the left end as viewed in FIG. 3. The tapered ends 25 of the legs of the U-shaped element facilitate insertion of the element into the bracket, and once the shoulders 23 snap over the ends of the channel, they inhibit movement of the element 5 in its own plane in either direction and locate it longitudinally.

In the wire element and bracket assembly shown in FIG. 4, the bracket 1 is provided with a threaded aperture, and the element 5 is provided with a threaded part 27 and a triangular part 29. The base 31 of the triangular part 29 is engageable by the spiral cam portion of the rotatable stud, and its position in relation to the bracket 1 is readily adjustable by screwing the part 27 further into or out of the threaded aperture in the bracket. Nuts 33 lock the part 27 in the desired position. Since the leg 35 of the triangular part is not attached to the leg 37, the element may be made of rigid material which resists bending when the base 31 is engaged by the spiral cam portion of the rotatable stud.

In the wire element and bracket assembly shown in FIGS. 5 and 6, the bracket 1 has two separate straight parallel apertures 39 in which parallel arms of the element 5 fit. Pronged lock washers 41 engage the ends of the arms of the element to prevent its withdrawal in a direction parallel to its own plane to the left, as viewed in the drawing, while a shoulder 43 limits movement of the element to the right.

In the wire element and bracket assembly shown in FIGS. 7 and 8, the bracket 1 is not channel shaped. It has a central portion 45 which is welded to one of the members, and turned over end parts 47. The element 5 is U-shaped, and each arm has a pair of shoulders 49 and a straight portion 51. The latter portions 51 fit in the turned over parts 47 which prevent removal of the elements in a direction perpendicular to the plane which contains the arms, and the shoulders 49 engage the ends of the bracket to inhibit movement in a direction parallel to its own plane of the element to the left or right. The spiral cam portion of the rotatable stud, in use, engages the straight base portion 18 of the element 5 as in the previous assemblies.

In the assemblies shown in FIGS. 9 and 10, the bracket 1 is the same as the bracket of the assembly shown in FIG. 3. This bracket must be welded, however, at the edge of a raised portion of the member to which it is attached (such as the channel base 11 in FIG. 2) to enable a nut and washer to be fitted thereto. The element 5 is forged and has a loop part 23 having a straight portion 55 engageable by the spiral cam portion of the rotatable stud, a body part 57 which makes a sliding fit in the channel of the bracket, and a threaded end 59. A nut 61 and washer 63 hold the element 5 in position in the bracket 1.

The assembly of FIGS. 11 and 12 is virtually the same as the assembly of FIGS. 9 and 10, the only difference being that the end 59 of the element is not threaded and the element is held in position by a pronged lock washer 65.

In the assemblies shown in FIGS. 1 and 3, the position of the straight portion 18 of the wire element 5 is dependent upon the location of the bracket 1 and upon the location of the shoulders on the legs of the wire element. The latter cannot be adjusted after the brackets have been welded into position. The assemblies shown in FIGS. 1 and 3 may, however, be attached to any reasonably flat surface, and need not, like the assemblies of FIGS. 4, or 5 and 6, or 9 and 10, or 11 and 12, be located at the edge of a raised portion such as the base 11 of the channel shown in FIG. 2.

It will be understood that the invention is not to be limited to the exact construction shown and described, but that various changes and modifications may be made without departing from the spirit and scope of the invention, as defined in the appended claims:

I claim:

1. A quick-operating fastening device for releasably securing two members to each other, comprising:
   a stud means adapted to be turnably mounted on one of said members,
   said stud means having spiral cam locking means thereon,
   a mounting bracket adapted to be secured to the other of said members,
   said mounting bracket having a channel section with a base portion and substantially parallel side walls,
   a substantially U-shaped wire element having a base portion interlocked with said spiral cam locking means and leg portions extending therefrom,
   said leg portions each having spaced shoulder portions thereon,
   said leg portions coacting with said channel section base portion and said shoulder portions coacting with the contiguous channel section side walls to inhibit movement of said spiral cam interlocked base portion in a direction parallel to or transversely of the axis of said stud means during interlocking engagement between said spiral cam locking means and said wire element base portion upon turning movement of said stud means,
   said element upon disengagement of said leg portion from said spiral cam locking means being displaceable from said bracket in a direction transversely of said stud means axis upon said leg portions being flexed toward each other to disengage the respective spaced shoulder portions from the channel section side walls.

2. A quick-opening fastening device for releasably securing two members to each other, comprising:
   a stud means adapted to be turnably mounted on one of said members,
   said stud means having spiral cam locking means thereon,
   a mounting bracket adapted to be secured to the other of said members,
   said mounting bracket having a channel section with a base portion and substantially parallel side walls,
   a substantially U-shaped wire element having a base portion interlocked with said spiral cam locking means and leg portions extending therefrom,
   each of said leg portions having a shoulder portion intermediate the ends thereof and terminating in a hook portion,
   said leg portions coacting with said channel section base portion and said shoulder and hook portions coacting with the contiguous channel section side walls to inhibit movement of said spiral cam interlocked base portion in a direction parallel to or transversely of the axis of said stud means during interlocking engagement between said spiral cam locking means and said wire element base portion upon turning movement of said stud means,
   said element upon disengagement of said base portion from said spiral cam locking means being displaceable from said bracket in a direction transversely of said stud means axis upon said leg portions being flexed toward each other to disengage the respective spaced shoulder portions from the channel section side walls.

References Cited by the Examiner

UNITED STATES PATENTS

| | | | |
|---|---|---|---|
| Re. 22,404 | 12/1943 | Mackie | 24—221 |
| 310,301 | 1/1885 | Miller | 24—230 |
| 421,735 | 2/1890 | Lippy | 24—230 |
| 449,945 | 4/1891 | Napion | 85—1 |
| 2,270,403 | 1/1942 | Bignell et al. | |
| 2,293,581 | 7/1942 | Whitesell. | |
| 2,314,470 | 3/1943 | Warren. | |
| 2,444,040 | 6/1948 | Gower. | |
| 2,461,215 | 3/1949 | Judge | 24—215 |
| 2,797,036 | 6/1957 | Geiger | 85—9 |
| 2,805,499 | 9/1957 | Nutter et al. | 24—230 X |
| 3,126,729 | 3/1964 | Leopoldi | 24—215 |

WILLIAM FELDMAN, *Primary Examiner.*

G. WEIDENFELD, *Assistant Examiner.*